INVENTORS
ROBERT FREDRICK BRUNNER
CHARLES H. C. VAN PELT
BY

*Kinney & Schenk*
ATTORNEYS

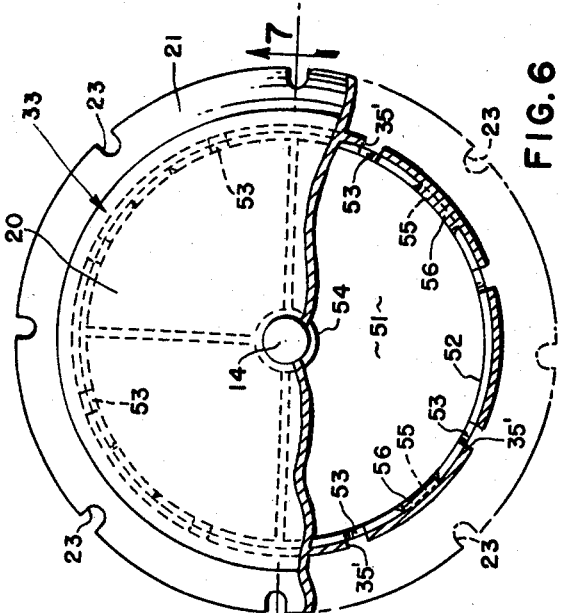
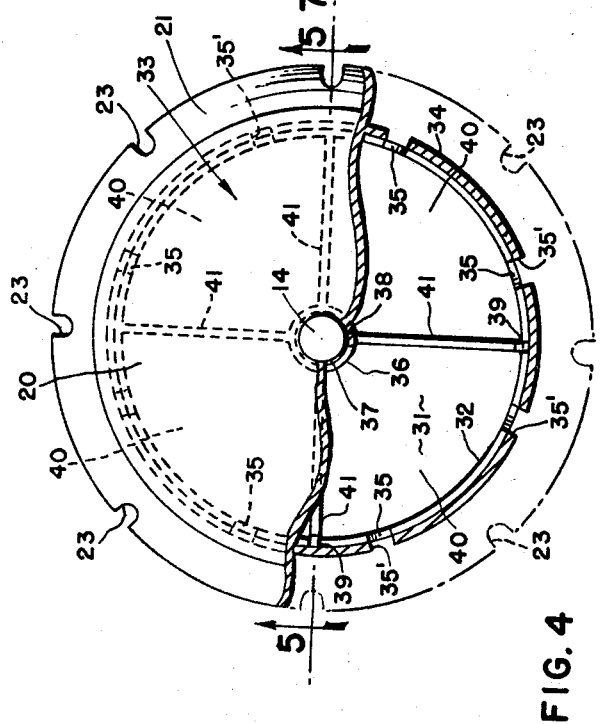
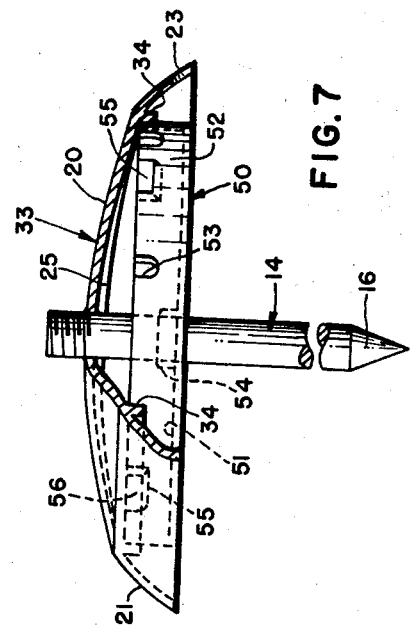
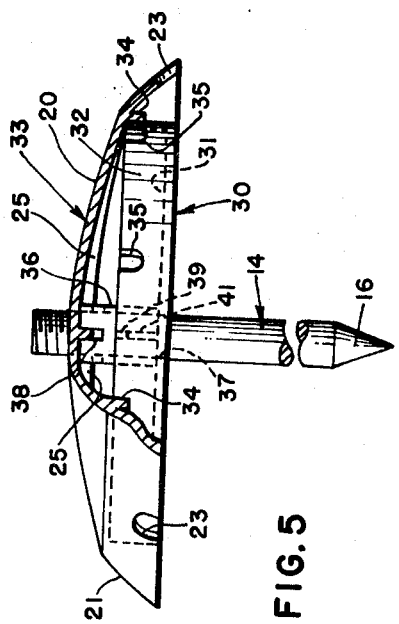
INVENTORS
ROBERT FREDRICK BRUNNER
CHARLES H. C. VAN PELT
BY
*Kinney & Schenk*
ATTORNEYS

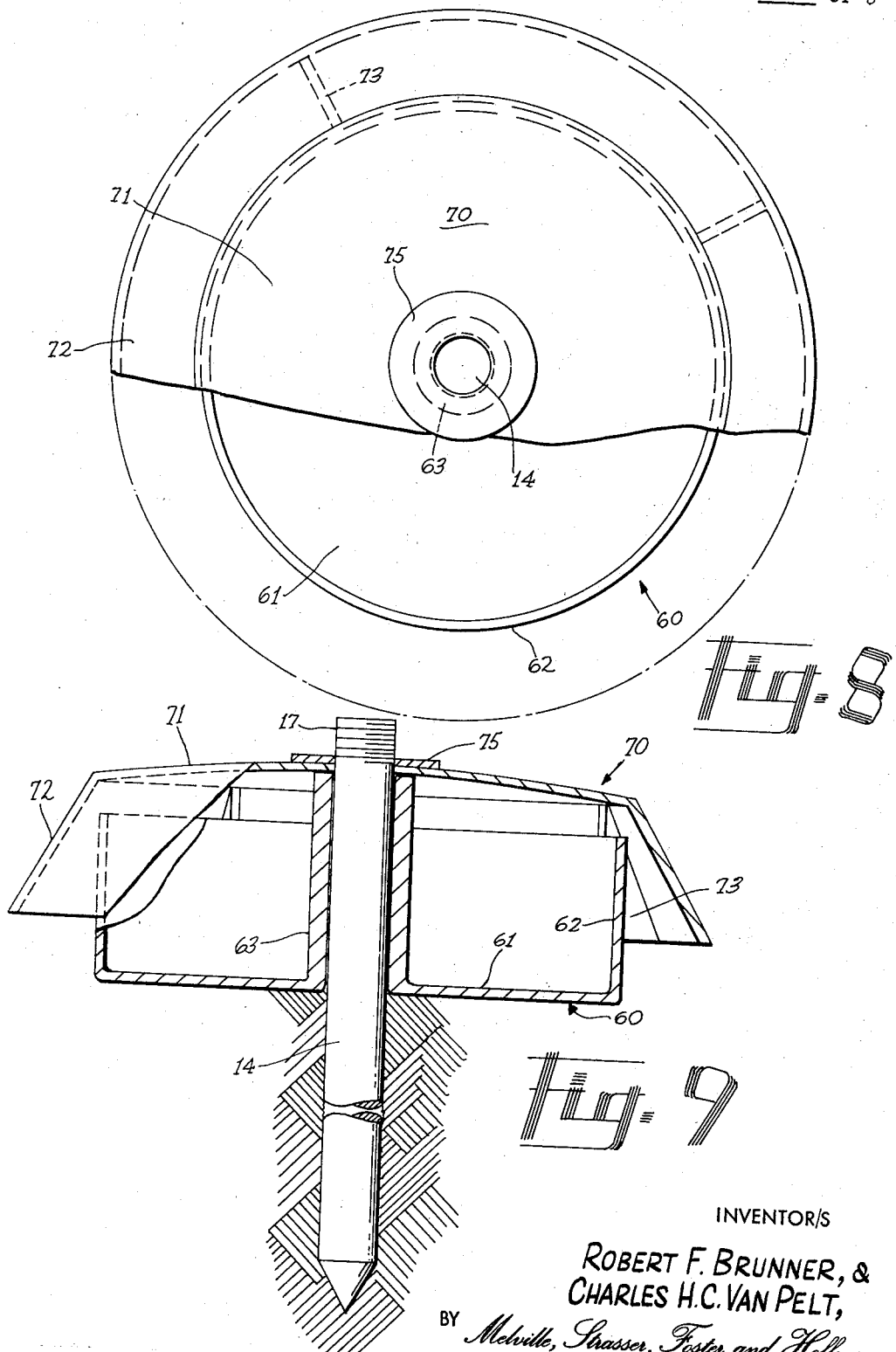

United States Patent Office 3,427,743
Patented Feb. 18, 1969

3,427,743
INSECT BAIT DISPENSER
Robert F. Brunner, 1624 1st Ave., Cincinnati, Ohio 45205, and Charles H. C. Van Pelt, 2625 Fair Oaks Lane, Cincinnati, Ohio 45237
Continuation-in-part of application Ser. No. 616,622, Feb. 16, 1967. This application Feb. 21, 1968, Ser. No. 712,323
U.S. Cl. 43—131      9 Claims
Int. Cl. A01m 1/20, 25/00

ABSTRACT OF THE DISCLOSURE

Insect exterminating device containing poisoned bait which may be dispensed to insects but constructed to prevent children or animals from reaching the poisoned bait.

Cross-reference to related application

This is a continuation-in-part of abandoned application Ser. No. 616,622 filed Feb. 16, 1967, in the names of Robert Frederick Brunner and Charles H. C. Van Pelt and entitled Insect Bait Dispenser.

Background of the invention

This invention relates to an insect bait dispenser, and more particularly to a device for dispensing poisoned bait for insects such as ants and bugs.

Previous containers or dispensers of poisoned bait for insects such as ants or bugs have been constructed so that children may rather easily obtain access to the bait. One type of prior devices included a cover that was held on by spring fingers and a nail driven into the ground or the like. However, the cover offered a sufficiently large surface for grasping so that a child could easily lift the cover from the container and reach the bait.

Another type of device locked the cover by turning the cover. Since young children are great imitators, a child would quickly learn how to remove the cover by turning so that the child could gain access to the poisoned bait.

In the same manner, another type of device utilized a cover that was threadedly secured to the bait support member. Again, a child could easily unthread the cover and obtain access to the bait. Furthermore, this device was constructed so that a child could insert a stick or the like within apertures in the cover to reach the bait.

In the prior devices, only a single compartment for one type of bait has been employed. Thus, the user has been required to select the bait that he believes will produce the best results for the specific insect that he wishes to destroy.

Summary of the invention

This invention contemplates an insect exterminating device including a base member adapted to rest on a supporting surface and having a bait supporting portion, and a cover which fits over the bait supporting portion and is releasably secured to the supporting surface.

The cover is positioned over the bait supporting portion of the base member and secured to the supporting surface by means of a detachable handle. When the cover is in place, the handle is removed, thereby substantially preventing accidental or unauthorized access to the poisoned bait.

The invention also contemplates a barrier coacting with the base member and cover so as to provide a tortuous path from outside the cover to the bait supporting portion, so that a stick or child's fingers may not be directly inserted into the portion of the dispenser supporting the poisoned bait.

In addition, the bait supporting portion of the base member is designed to accommodate several different types of bait, each separated from the other. Thus, bait for different insects or different types of bait for the same insect may be readily utilized with the present invention.

Brief description of the drawing

FIGURE 4 is a top plan view, partly in section and partly broken away, of another embodiment of the present invention.

FIGURE 5 is a sectional view, partly in elevation, taken along the line 5—5 of FIGURE 4.

FIGURE 6 is a top plan view, partly in section and partly broken away, of a further embodiment of the present invention.

FIGURE 7 is a sectional view, partly in elevation taken along line 7—7 of FIGURE 6.

FIGURE 8 is a top plan view, partly in section and partly broken away, of a further embodiment of the present invention.

FIGURE 9 is a sectional view, partly in elevation, taken along the line 9—9 of FIGURE 8.

Description of the preferred embodiments

Figure 1:
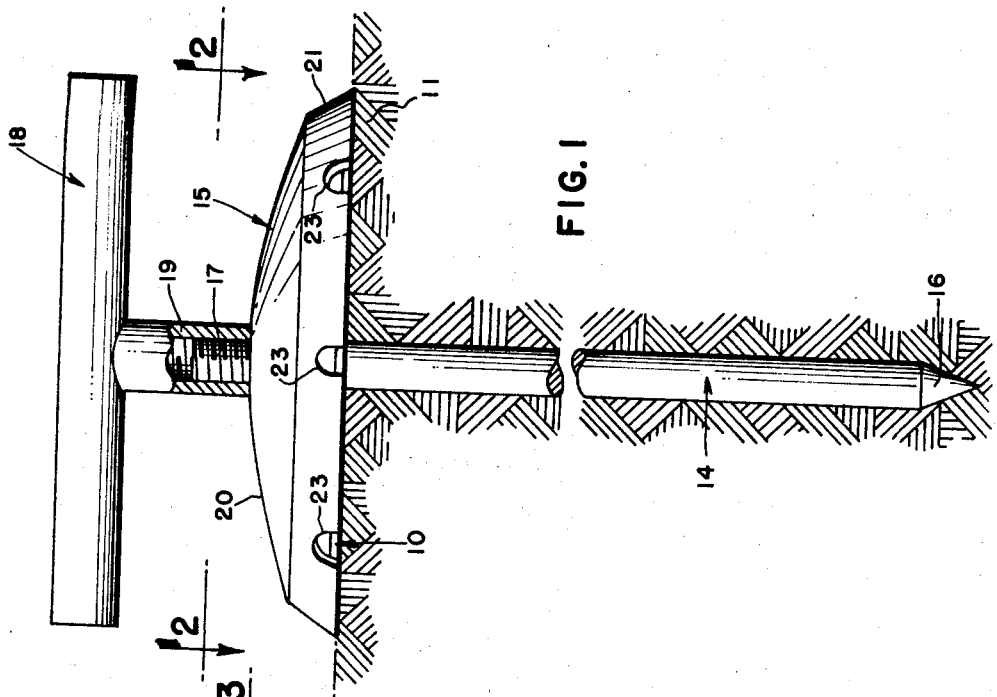
FIGURE 1 is a side elevational view, partly in section, of one form of the dispenser of the present invention disposed on the ground.
Figure 2:
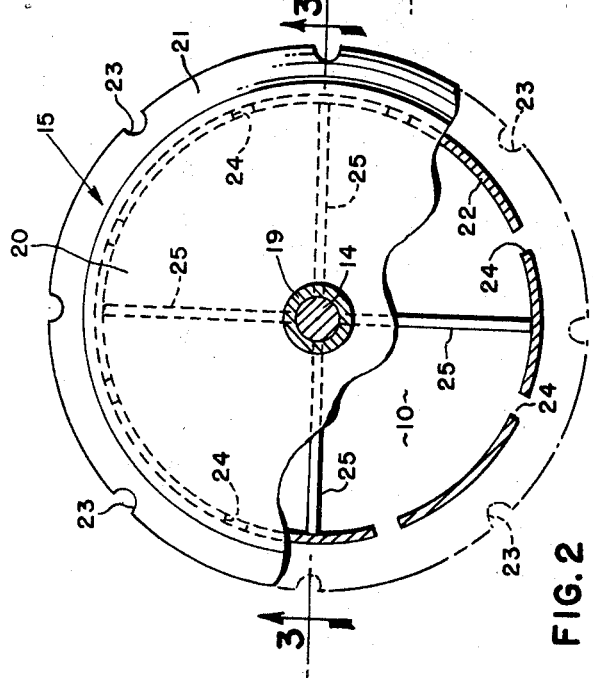
FIGURE 2 is a top plan view, partly in section and partly broken away, taken along the line 2—2 of FIGURE 1.
Figure 3:
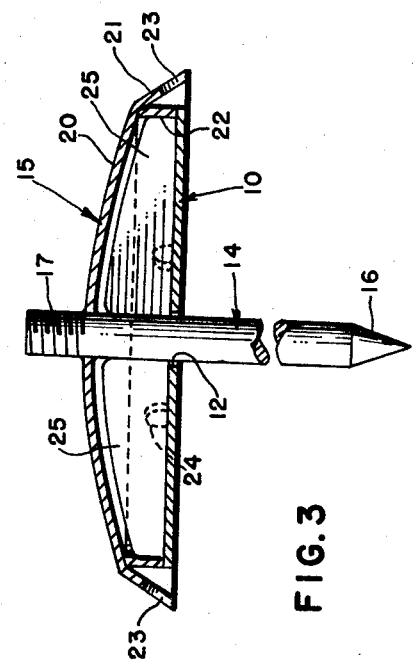
FIGURE 3 is a sectional view, partly in elevation, taken along the line 3—3 of FIGURE 2.

Referring to the drawings and particularly FIGURES 1 to 3, there is shown one form of the dispenser of the present invention. The dispenser includes a base or support member 10, which rests on ground 11. The base member 10 has an opening 12 in its center to permit a stem 14 to easily pass therethrough.

The stem 14 is preferably formed integral, adjacent its upper end, with a cover 15, which has a substantially inverted bowl shape. Of course, the stem 14 could be formed separate from the cover 15 and attached thereto if desired. The stem 14 has its lower end 16 pointed while the portion of the stem 14 extending above the cover 15 has threads 17 thereon. Thus, the pointed end 16 of the stem 14 permits ready penetration through the ground 11 when the stem 14 is urged into the ground 11.

A handle 18 has a cylindrical portion 19 extending downwardly therefrom and threaded on its interior surface for cooperation with the threads 17 on the stem 14. Thus, the handle 18 may be readily connected or disconnected from the stem 14. It should be understood that any other type of quick connecting and disconnecting structure may be employed for connecting the handle 18 to the stem 14.

Furthermore, if desired, the handle 18 may be eliminated. In such an arrangement, the threads 17 on the stem 14 would be omitted and the stem 14 could be formed with a passage extending therethrough substantially perpendicular to the longitudinal axis of the stem 14 for receipt of a screw driver or rod, for example.

As clearly shown in FIGURE 3, the cover 15 has a curved central portion 20 with an angular portion 21 extending downwardly and outwardly therefrom for contact with the ground 11 when the cover 15 is moved downwardly. The cover 15 has an annular inner wall 22, which is substantially the same diameter as the base member 10, extending downwardly from the portion 20 adjacent its intersection with the portion 21. When the cover 15 is moved downwardly so that the edge of the portion 21 engages the ground 11, the wall 22 will engage the upper surface of the base member 10 adjacent the periphery of the base member 10 (see FIGURE 3) to form a barrier between the portion of the base member 10 having hte bait supported or disposed thereon and the angular portion 21 of the cover 15.

The angular portion 21 of the cover 15 has a plurality of apertures or openings 23 formed in its edge. The size of the apertures 23 is such that insects such as ants may readily enter the interior of the cover 15 through the apertures 23. The apertures 23 also are preferably spaced from each other sufficiently (see FIGURE 2) so that one cannot easily get a grip on the cover 15 through the apertures 23.

As shown in FIGURE 2, the inner wall 22 of the cover 15 has apertures or openings 24 formed therein along its bottom edge. The apertures 24 are not in alignment with the apertures 23 in the cover 15. Thus, a circuitous path is provided from exterior of the cover 15 into the bait support portion of the base member 10. Accordingly, a child's finger or a stick or other similar devices may not be inserted into the bait support portion of the base member 10.

A plurality of ribs 25 extends along the lower surface of the central portion 20 of the cover 15 between the stem 14 and the inner wall 22 to add strength to the cover 15. As shown in FIGURE 2, there are four of these ribs 25 with each spaced 90° from the adjacent ribs.

Considering the operation of the embodiment of FIGURES 1 to 3, the base member 10 is disposed on the ground 11. With the handle 18 attached to the stem 14, the stem 14 has its pointed end 16 guided through the opening 12 in the center of the base member 10 and into the ground 11. By urging downwardly on the handle 18, the cover 15 is moved downwardly until the edge of the portion 21 of the cover 15 engages the ground 11 and the inner wall 22 is in engagement with the upper surface of the base member 10.

When the cover 15 is firmly positioned, the handle 18 is disconnected from the stem 14, and the dispenser remains in position. It may not be tipped over by animals nor may it be readily moved by children.

When it is necessary to replenish the supply of bait on the base member 10, it is only necessary to gain attach the handle 18 to the stem 14, and then lift up on the handle 18 to raise the cover 15. Additional bait may be added to the base member 10, or the base member 10 may be moved to another position.

Referring to FIGURES 4 and 5, there is shown another form of the dispenser of the present invention wherein a base member 30 has a bottom portion 31 and an annular wall 32 extending upwardly from the upper surface of the bottom portion 31 adjacent the periphery of the bottom portion 31. A cover 33 is preferably integral with the stem 14 in the same manner as the cover 15 of FIGURES 1 to 3.

The cover 33 is similar to the cover 15 in that it has the curved central portion 20 and the angular portion 21 with the apertures 23 in the portion 21. However, the inner wall 22 is replaced by an annular flange 34 extending downwardly from the lower surface of the cover 33 adjacent the intersection of the portion 20 and the portion 21. The flange 34 is disposed in contiguous relation with the outer surface of the upstanding wall 32 of the base member 30 whereby they cooperate to form a barrier between the apertures 23 and the bait support portion of the base member 30; the bait support portion of the base member 30 is the bottom portion 31 within the annular wall 32.

A plurality of spaced apertures 35 is formed in the upper edge of the annular wall 32 of the base member 30. Since the flange 34 overlies the apertures 35, the flange 34 has apertures 35' therein for cooperation with the apertures 35. The apertures 35 and 35' are disposed out of alignment with the apertures 23.

The base member 30 has a hub 36 extending upwardly from the bottom portion 31 to a greater height than the wall 32 and surrounding an opening 37 in the center of the bottom portion 31 of the base member 30. Thus, when the stem 14 moves downwardly, it passes through the hub 36 and then through the opening 37.

The hub 36 has notches 38 formed in its upper portion and in radial alignment with notches 39, which are formed in the upper edge of the annular wall 32 of the base member 30. The aligned notches 38 and 39 receive portions of the ribs 25 on the cover 33 to insure that the apertures 23 are not aligned with the apertures 35; and, that the apertures 35' in the flange 34 are aligned with the apertures 35 when the cover 33 is moved downwardly. Thus, the embodiment of FIGURES 4 and 5 does not require the user to guide the cover 33 to insure that the apertures 23 are not aligned with the apertures 35 since the cover 33 may not be moved completely downwardly until the aligned notches 38 and 39 receive the ribs 25 of the cover 33.

The bait support portion of the base member 30 is divided into a plurality of compartments 40 by partitions 41 extending between the hub 36 and the annular wall 32 and preferably formed integral therewith. The partitions 41 extend upwardly from the bottom portion 31 of the base member 30 and are preferably formed integral therewith. Each of the compartments 40 may have a different type of bait therein if desired.

Considering the operation of the embodiment of FIGURES 4 and 5, it is first necessary to align the ribs 25 with the notches 38 and 39. As previously mentioned, this automatically insures that the apertures 23 in the cover 33 are not aligned with the apertures 35 in the annular wall 32 of the base member 30 and that the apertures 35' in the flange 34 of the cover 33 are aligned with the apertures 35.

With the ribs 25 aligned with the notches 38 and 39, the stem 14 extends through the hub 36 and the opening 37 in the base member 30 so that the pointed end 16 of the stem 14 extends beneath the base member 30. With the handle 18 attached to the stem 14, urging downwardly on the handle 18 causes the pointed end 16 of the stem 14 to penetrate the ground 11 until the base member 30 rests on the ground 11. Of course, if desired, the pointed end of the stem 14 could be urged downwardly by pushing on the cover 33 without any need of the handle 18.

Referring to FIGURES 6 and 7, there is shown another modification of the present invention wherein a base member 50 is utilized rather than the base member 30 with the cover 33. The base member 50 includes a bottom portion 51 and an annular upstanding wall 52 in the same manner as the base member 30. Furthermore, the base member 50 has apertures 53 formed in the upper edge of the annular wall 52 in the same manner as the base member 30 and cooperating with the apertures 35' in the flange 34.

However, the bait support portion of the base member 50 is not divided into separate compartments as is the member 30. Additionally, a hub 54, which is shorter than the wall 52, extends upwardly from the bottom portion 51 of the base member 50 because the hub 54 is not utilized to insure that the apertures 53 of the base member 50 are not aligned with the apertures 23 of the cover 33 and that the apertures 35' in the flange 34 of the cover 33 are aligned with the apertures 53.

Instead, bosses 55 are formed on the upper portion of the annular wall 52 of the base member 50. When the cover 33 is moved downwardly, the bosses 55 fit within notches 56. The notches 56 are formed in the annular flange 34 of the cover 33. If desired, the notches 56 could be formed in the annular wall 52 of the base member 50 and the bosses 55 formed on the flange 34.

In order to insure that the apertures 53 are not aligned with the apertures 23 but aligned with the apertures 35', it is necessary for the notches 56 in the flange 34 to receive the bosses 55. Otherwise, the operation of the modification of FIGURES 6 and 7 is the same as that previously described with respect to the form of FIGURES 4 and 5.

Referring to FIGURES 8 and 9, there is shown another modification of the present invention including the base member indicated generally at 60 which is adapted to rest upon the ground. The base member 60 is provided with the bottom or bait supporting portion 61 and an annular upstanding wall 62. In its center, the base member is provided with the hub 63. It will be observed that this hub 63 is somewhat higher than the annular wall 62, for purposes to be described presently. In addition, the hub 63 has a passage through its center to permit the stem 14 to easily pass therethrough.

The cover indicated generally at 70 again has a substantially inverted bowl shape. It has a curved central portion 71 and an angular portion 72 extending downwardly therefrom toward the ground. However, it should be noted that when the cover is in place as shown in FIGURE 9, it will be supported by the topmost portion of the hub 63, and in this position, the peripheral edge of the cover 72 is spaced upwardly from the ground by a short distance. If desired, the cover may be provided with the ribs 73 which will insure concentricity between the cover and base member.

In this embodiment of the invention, the stem 14 is again provided with the pointed lower end 16, and the threaded portion 17 which will extend a short distance above the top surface of the cover 70. In this embodiment, the stem has secured to it the washer or flange 75, and the stem itself is not secured to the cover 70.

In operation of this embodiment, the poisoned bait is placed in the bait supporting portion 61 of the base member 60 and located in a suitable spot on the ground. The cover 70 is then placed over the base member, and the stem 14, having a handle 18 attached thereto is guided through the aligned openings in the top of the cover and in the hub 63 and urged downwardly until the washer 75 contacts the top surface of the cover 70. When the stem 14 has been firmly positioned, the handle 18 may be disconnected from the stem 14, and the dispenser remains in position.

It will be observed that with the components positioned as shown in FIGURE 9, the lower peripheral edge of the cover 70 is spaced a short distance above the ground. This in effect provides an annular opening for the passage of insects and the like. Similarly, the upper peripheral edge of the wall 62 is spaced a short distance below the inside surface of the cover 70, again providing an annular opening for the passage of insects and the like into the bait supporting portion 61. Obviously, the annular openings just described are again arranged to provide a non-linear or tortuous path from outside the cover to the bait supporting portion. As already indicated, this arrangement prevents a stick, children's fingers, or small animals from reaching the poisoned bait.

This particular embodiment of the invention is significant in still another respect. That is, it has been found that when using for example the embodiment shown in FIGURES 1 through 3, insects can pass through the apertures 24 in the barrier wall 22, but will then crawl up the inside of the wall 22 and across the under surface of the portion 20 of the cover 15, thereby avoiding poisoned bait carried by base member. In the embodiment last described, it will be apparent that it is impossible for small insects and the like to contact the cover member without passing through the area containing the poisoned bait.

For purposes of exemplification, particular embodiments of the invention have been shown and described according to the best present understanding thereof. However, it will be apparent to the skilled worker in the art that certain changes and modifications may be made in its construction. For example, both the base member and cover could take any desired shape. Similarly, the apertures described in connection with the earlier embodiments may be different in design, and may be located in other portions of the cover if desired.

The embodiments of the invention in which an exclusive property or privilege is claimed are defined as follows:

1. A bait dispenser comprising a base member having a bait support portion, a cover adapted to fit over said base member to cover said bait support portion of said base member and having a plurality of spaced apertures, means to position said cover with respect to said base member to insure that said cover covers said bait support portion of said base member when said cover fits over said base member, and barrier means associated with at least one of said base member and said cover and having a plurality of spaced apertures, said barrier means being spaced inwardly from the periphery of said cover to define an annular passage between said cover and said barrier means, said barrier means preventing linear passage from outside said cover to said bait supporting portion of said base member.

2. The dispenser according to claim 1 in which said barrier means comprises a wall formed integral with said cover and extending downwardly from said cover to engage the upper surface of said base member adjacent its periphery when said cover fits over said base member.

3. The dispenser according to claim 1 in which said barrier means comprises a wall integral with said base member and extending upwardly from said base member and a flange extending downwardly from said cover for cooperation with said wall.

4. The dispenser according to claim 1 including means to insure that said apertures in said barrier means are out of alignment with said apertures in said cover.

5. The dispenser according to claim 4 in which said insuring means are attached to said cover and to said base member.

6. The bait dispenser claimed in claim 1 including means for releasably securing said cover to said supporting surface.

7. The bait dispenser claimed in claim 6 wherein said base member includes an aperture, and wherein said means for releasably securing said cover to said supporting surface comprises a stem, said stem passing through said aperture in said base member.

8. The bait dispenser claimed in claim 7 wherein said stem includes a portion extending above the top surface of said cover, said portion including means for detachably securing a handle thereto.

9. A bait dispenser adapted to be firmly anchored to a supporting surface comprising in combination:
  (a) a bait dispenser including
    (i) a base member adapted to rest on said supporting surface and including a bait support portion, said base member having an aperture;
    (ii) a cover adapted to fit over said base member to cover said bait support portion of said base member; and (iii) barrier means associated with at least one of said base member and said cover, said barrier means preventing linear passage from outside said cover to said bait support portion;
  (b) a stem adapted to pass through said aperture in said base member and engage said supporting surface, said stem including a portion having means for detachably securing a handle thereto;
  (c) means operative to secure said stem to said cover for effectively and firmly securing said bait dispenser to said supporting surface; and
  (d) handle means comprising an insertion and removal means for said stem including means for cooperating with said means for detachably securing a handle to said stem, whereby substantial force can be exerted on said stem along its longitudinal axis.

(References on following page)

References Cited

UNITED STATES PATENTS

| | | | |
|---|---|---|---|
| 1,443,287 | 1/1923 | Snyder et al. | 43—131 |
| 1,577,351 | 3/1926 | Alvarez | 43—131 |
| 1,700,517 | 1/1929 | Ross | 43—131 |
| 1,887,771 | 11/1932 | Marsh | 43—131 |
| 1,960,464 | 5/1934 | Thalheimer | 43—131 |
| 2,710,485 | 6/1955 | Starr | 43—131 |
| 2,736,127 | 2/1956 | McCann | 43—131 |
| 2,837,861 | 6/1958 | Graham | 43—131 |
| 2,953,868 | 9/1960 | Chambers | 43—131 |
| 3,008,262 | 11/1961 | Ronicker | 43—131 |
| 3,303,600 | 2/1967 | Freeman | 43—131 |

ALDRICH F. MEDBERY, *Primary Examiner.*